United States Patent [19]

Iizuka et al.

[11] Patent Number: 4,668,572

[45] Date of Patent: May 26, 1987

[54] PENCIL LEAD COMPOSITION WITH MAGNESIUM OXYSULFATE FIBROUS MATERIAL

[75] Inventors: Fumio Iizuka, Koshigaya; Shin Shimoyama, Soka; Yoshiaki Abe, Tokyo, all of Japan

[73] Assignee: Pentel Kabushiki Kaisha, Tokyo, Japan

[21] Appl. No.: 874,087

[22] Filed: Jun. 13, 1986

[30] Foreign Application Priority Data

Jun. 28, 1985 [JP] Japan .................................. 60-141687

[51] Int. Cl.⁴ ...................... B32B 9/00; C09D 13/00; D02G 3/00
[52] U.S. Cl. .................................. 428/330; 106/19; 523/164; 428/364; 428/401
[58] Field of Search .......................... 106/19; 523/164; 428/330, 364, 401

[56] References Cited

U.S. PATENT DOCUMENTS

4,371,632 2/1983 Grossman et al. .................. 523/164
4,562,230 12/1985 Fukui et al. .......................... 525/74

FOREIGN PATENT DOCUMENTS

48-18347 6/1973 Japan ..................................... 106/19
54-72117 6/1979 Japan ..................................... 106/19

*Primary Examiner*—George F. Lesmes
*Assistant Examiner*—Susan S. Rucker
*Attorney, Agent, or Firm*—Wenderoth, Lind & Ponack

[57] ABSTRACT

A pencil lead comprising a binder, a filler and a colorant as essential components, said filler consisting at least partially of a fibrous material of magnesium oxysulfate. This pencil lead has a high bending strength and a stable quality which does not degrade with the lapse of time, and it can write well.

5 Claims, No Drawings

PENCIL LEAD COMPOSITION WITH MAGNESIUM OXYSULFATE FIBROUS MATERIAL

BACKGROUND OF THE INVENTION

This invention relates to a lead of an ordinary pencil or mechanical pencil, and more particularly it relates to a lead comprising a colorant and a filler dispersed in a binder, wherein the filler comprises a fibrous material.

It is already well known that a fibrous material can be used as at least part of a filler or extender in a lead comprising a colorant and a filler dispersed in a binder. For instance, Japanese Patent Publication No. 48-18347 discloses the use of fibrous graphite, carbon or the like, and Japanese Patent Laid-Open Specifications No. 52-88419 and No. 56-163171 disclose the use of fibrous potassium titanate.

The aim of using a fibrous material as a filler resides in an improvement in bending strength. Namely, it is anticipated that if a fibrous material is contained in an oriented state in a rod-like form, its bending strength could be increased.

However, even if these fibrous materials are actually used as the filler for a pencil lead, the binding strength can be rarely improved contrary to expectation. In addition, a pencil having such a lead often will not write well. This is because the hardness of these fibrous materials is too high and, in an extreme case, it is so high that the surface of writing paper is injured.

A fibrous material which can give a relatively good result is potassium titanate. Potassium titanate has a relatively low hardness, i.e., a Mohs hardness of 4-5, so that it can write sufficiently in practice. Further, it can provide a lead having a bending strength more excellent than that of a product containing no potassium titanate. However, it has a drawback that, when exposed to the air for a long time, its bending strength decreases with the lapse of time by the influence of moisture. This phenomenon may be considered to arise from the concentration of the absorbed moisture at the interface between the potassium titanate and the binder in the lead, with consequent poor adhesion therebetween.

SUMMARY OF THE INVENTION

It is an object of this invention to overcome the drawbacks in the above-mentioned prior art techniques, and to provide a pencil lead which can fully exhibit an effect of a fibrous filler on improving the bending strength, is so stable that the bending strength thereof does not change with the lapse of time, and has a good writability.

According to this invention, there is provided a pencil lead comprising a binder, a filler and a colorant as essential components, said filler consisting at least partially of a fibrous material, characterized in that magnesium oxysulfate (hereinafter abbriviated as "MOS") is used as the fibrous material.

Fibrous MOS may be used alone as the filler. If necessary, it may also be used in combination with other fillers of various forms such as non-fibrous or fibrous form, and of various materials.

In addition to the above-mentioned essential components, a lubricant, a softener, a solvent, etc., which are conventionally used as components of a pencil lead may also be used when necessary.

DETAILED DESCRIPTION OF THE INVENTION

MOS employed as a fibrous filler in this invention is a hydrated inorganic substance represented by the chemical formula: $MgSO_4.5MgO.8H_2O$ and has a Mohs hardness of 3-4. Such a relatively low hardness is desirable in that, as mentioned earlier, writing friction can be controlled and writability is not injured. In addition, because MOS is not intensely colored, it is desirable in that it does not inhibit the color development of colorants of a variety of colors including black.

Fibrous MOS used in this invention preferably has a diameter of about 0.1-1 $\mu$m and a length of about 10-100 $\mu$m. Of course, these sizes can be mentioned as average or range.

Now, description will be made about materials which are used together with MOS. First, examples of the binder include nitrocellulose, cellulose acetate, epoxy resins, acrylonitrile/styrene copolymer resins, polystyrene, polyethylene, polyvinyl chloride, polymethyl methacrylate, phenolic resins, and polyvinyl alcohol, which may be used alone or as a mixture of at least two of them. Among them, cellulosic resins, especially, nitrocellulose is desirable in that it is tough, hard and elastic and, in addition, excellent in processability and shape stability.

With respect to the colorant, all of the inorganic and organic colorants of the so-called dye or pigment types can be used. An organic pigment such as a lake pigment or toner is desirable in that good color development can be obtained. In order to meet special application where no tracing of writing must be left on a copy obtained by using a copying machine which is recently widespread, it is desirable to use pink, blue or violet dyes.

Especially, when a pigment which is used without being dissolved is employed, it is preferable to use a pigment of a particle diameter of about 0.1-1.0 $\mu$m. When a pigment of such a particle diameter is used, the bending strength of the obtained product is particularly high and the longitudinal cracking of a lead during writing, which is frequently encountered when a fibrous filler is used, can be prevented.

Although the above-mentioned three essential components, i.e., a binder, a filler and a colorant, may be used at a suitable mixing ratio, it is preferable that MOS is used in an amount of about 30-60 wt.% based on the total amount of the three components.

Although fibrous MOS may be used alone as the filler, it may be used in combination with other fillers such as, for example, talc, mica, montmorillonite, kaolin, bentonite, calcium carbonate, graphite, etc. These fillers may be employed in various forms such as non-fibrous or fibrous form.

The pencil lead of this invention may contain, if necessary, conventional additives, e.g. a lubricant such as wax, stearic acid or its salt, a softener such as dioctyl phthalate and a solvent such as methyl ethyl ketone in addition to the above-mentioned three components.

Especially, when distearyl ketone is employed as a lubricant, the smoothness in writing is excellent and further the resinforcing effect of the fibrous filler is highly developed, as comapred with the case when other lubricants are employed. Distearyl ketone is broadly classified as wax which is solidified into a lump when its melt is cooled. This lump is unique in that it is readily disintegrated under a small shearing force. The above-mentioned effects as obtained when distearyl ketone is used is presumably ascribable to this property. A desirable amount of distearyl ketone is about 2-20 wt.%, preferably, about 5-10 wt.% based on the total amount of mixed materials except components which are removed during production, such as a solvent.

In the production of the pencil lead according to this invention, the above-mentioned mixture of materials are uniformly mixed together by means of rollers or a kneader and molded by, for example, extrusion or injection molding, and the molding is adjusted to a predetermined length to obtain a product. in the course of the production, heat treatment such as drying, surface treatment after molding and a like treatment may be suitably performed when necessary.

Since MOS is a hydrated substance as mentioned above, its deterioration by dehydration may sometimes occur when it is heated at an excessively high temperature in the heat treatment. Therefore it must be avoided in the heat treatment to expose MOS to such a high temperature as to cause its deterioration by dehydration.

This invention will now be described in more detail with reference to Examples and Comparative Examples, but it is to be noted that this invention is not limited to these Examples. In the Examples and Comparative Examples, "part" means part by weight.

EXAMPLE 1

|  | parts |
| --- | --- |
| nitrocellulose | 20 |
| fibrous MOS | 25 |
| (diameter of about 0.1-1 $\mu$m, length of about 10-100 $\mu$m) |  |
| stearic acid | 2 |
| aluminum stearate | 10 |
| Watchung Red NRS | 12 |
| (a red pigment, a product of Nippon Pigment Co., Ltd., an average particle diameter of about 0.7 $\mu$m) |  |
| distearyl ketone | 5 |
| methyl ethyl ketone | 100 |

The above materials were kneaded together by means of a three-roller mill and, after adjusting the content of the solvent, the mixture was extruded into a fine rod through an extruder. After fully removing the solvent, the rod was cut to a predetermined length to obtain red-color leads of a diameter of 0.5 mm.

EXAMPLE 2

This example was carried out in the same manner as in Example 1, except that nitrocellulose in Example 1 was replaced with an acrylonitrile/styrene copolymer resin.

EXAMPLES 3 TO 5

Each of these examples was carried out in the same manner as in Example 1, except that the amount (25 parts) of MOS used in Example 1 was varied to 15, 35 or 45 parts, respectively.

EXAMPLE 6

This example was carried out in the same manner as in Example 1, except that the amount (25 parts) of MOS used in Example 1 was varied to 20 parts and 5 parts of talc having particle diameter of about 1-10 $\mu$m (an average particle diameter of about 3 $\mu$m) was additionally mixed in the composition of Example 1.

EXAMPLE 7

This example was carried out in the same manner as in Example 1, except that Watchung Red NRS in Example 1 was replaced with Symuler Fast Orange V (an orange pigment, a product of Dai Nippon Ink & Chemicals Inc., an average particle diameter of about 0.3 $\mu$m).

EXAMPLE 8

This example was carried out in the same manner as in Example 1, except that Watchung Red NRS in Example 1 was replaced with Symuler Fast Yellow 5GS (a yellow pigment, a product of Dai Nippon Ink & Chemicals Inc., an average particle diameter of about 0.5 $\mu$m).

COMPARATIVE EXAMPLE 1

This example was carried out in the same manner as in Example 1, except that MOS used in Example 1 was replaced with fibrous potassium titanate (diameter of about 0.05-1 $\mu$m, length of about 10-50 $\mu$m)

COMPARATIVE EXAMPLE 2

This example was carried out in the same manner as in Example 6, except that MOS used in Example 6 was replaced with fibrous potassium titanate (diameter of about 0.05-1 $\mu$m, length of about 10-50 $\mu$m.).

COMPARATIVE EXAMPLE 3

This example was carried out in the same manner as in Example 1, except that MOS used in Example 1 was replaced with talc having particle diameter of about 1-10 $\mu$m (an average particle diameter of about 3 $\mu$m).

All of the pencil leads obtained in the above Examples and Comparative Examples wrote well and developed excellent color. The following table shows the results of measurements of the bending strength of the obtained leads.

|  | (unit: gf/mm$^2$) | |
| --- | --- | --- |
|  | Bending strength (i) | Bending strength (ii) |
| Ex. 1 | 15300 ± 600 | 15000 ± 400 |
| Ex. 2 | 11800 ± 400 | 11700 ± 450 |
| Ex. 3 | 14000 ± 300 | 14000 ± 250 |
| Ex. 4 | 16200 ± 400 | 16200 ± 450 |
| Ex. 5 | 15000 ± 300 | 14500 ± 400 |
| Ex. 6 | 13900 ± 500 | 13900 ± 500 |
| Ex. 7 | 14900 ± 400 | 14700 ± 450 |
| Ex. 8 | 14500 ± 350 | 14550 ± 300 |
| Comp. Ex. 1 | 13800 ± 400 | 10200 ± 600 |
| Comp. Ex. 2 | 12800 ± 400 | 9600 ± 350 |
| Comp. Ex. 3 | 8600 ± 300 | 7000 ± 300 |

Notes:
The measurements were made according to JIS S 6005. In the table, (i) was measured in an atmosphere of a temperature of 25° C. and a humidity of 50%, and (ii) was measured in an atmosphere of a temperature of 25° C. and a humidity of 85%.

The data were obtained by sampling 20 leads at random from the produced leads of the same lot and dividing them into two groups each composed of 10 leads for measurements of (i) and (ii).

This table shows that the leads obtained in Examples 1 to 8 have a high bending strength and can retain its strength even when the humidity is changed. Therefore, they have a quality which does not change with the lapse of time.

On the contrary, the lead obtained in Comprative Examples 1 and 2 in which fibrous potassium titanate used as a filler showed a higher bending strength than that obtained in Comparative Example 3 in which talc was used as a filler. However, the strength thereof varied markedly by the influence of moisture, suggesting that they have a quality which varies with the lapse of time.

What is claimed is:

1. A pencil lead comprising a binder, a filler and a colorant as essential components, said filler consisting at least partially of a fibrous material, characterized in that magnesium oxysulfate is used as the fibrous material.

2. A pencil lead according to claim 1, wherein said fibrous material of magnesium oxysulfate has a diameter of about 0.1–1 µm and a length of about 10–100 µm.

3. A pencil lead according to claim 1, wherein said fibrous material of magnesium oxysulfate is used in an amount of about 30–60 wt.% based on the total amounts of the binder, the filler and the colorant.

4. A pencil lead according to claim 1, wherein said colorant comprises a pigment of a particle diameter of about 0.1–1.0 µm.

5. A pencil lead according to claim 1, wherein distearyl ketone is further added as a lubricant to said essential components.

* * * * *